(12) United States Patent
Nakatsuka et al.

(10) Patent No.: US 6,632,562 B1
(45) Date of Patent: Oct. 14, 2003

(54) BATTERY MODULE COMPOSED OF A PLURALITY OF SERIALLY CONNECTED CELLS, AND METHOD AND STRUCTURE FOR CONNECTING CELLS

(75) Inventors: Saburo Nakatsuka, Kyoto (JP); Mizuo Iwasaki, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/786,225

(22) PCT Filed: Aug. 31, 1999

(86) PCT No.: PCT/JP99/04728

§ 371 (c)(1),
(2), (4) Date: Mar. 1, 2001

(87) PCT Pub. No.: WO00/13241

PCT Pub. Date: Mar. 9, 2000

(30) Foreign Application Priority Data

Sep. 1, 1998 (JP) .......................... 10-247178

(51) Int. Cl.[7] .......................... H01M 2/22; H01M 2/30
(52) U.S. Cl. .................. 429/158; 429/160; 429/178; 29/623.1

(58) Field of Search .............................. 429/158, 160, 429/178; 29/623.1

(56) References Cited

U.S. PATENT DOCUMENTS

| 3,923,549 A | | 12/1975 | Mabuchi et al. |
| 5,659,946 A | * | 8/1997 | Harima et al. .............. 29/623.4 |
| 5,900,332 A | * | 5/1999 | Marukawa et al. .......... 429/158 |

FOREIGN PATENT DOCUMENTS

| JP | 5772560 | 4/1982 |
| JP | 59224055 | 12/1984 |
| JP | 59224056 | 12/1984 |
| JP | 61162949 | 8/1986 |
| JP | 10106533 | 4/1998 |

* cited by examiner

Primary Examiner—Randy Gulakowski
Assistant Examiner—Jonathan Crepeau
(74) Attorney, Agent, or Firm—Jordan and Hamburg LLP (57) ABSTRACT

The sealing assembly for closing the open end of a cell case is formed with a connection electrode protruding outwards in the axial direction of the cell. The connection electrode of one of two adjacent cells is directly connected by welding to the bottom surface of the cell case of the other cell through a plurality of projections, for connecting the two cells in series.

14 Claims, 9 Drawing Sheets

Fig. 10

BATTERY MODULE COMPOSED OF A PLURALITY OF SERIALLY CONNECTED CELLS, AND METHOD AND STRUCTURE FOR CONNECTING CELLS

TECHNICAL FIELD OF THE INVENTION

The present invention relates to a method and a structure for connecting a plurality of cells in series for forming a battery module having a desired output voltage.

DESCRIPTION OF RELATED ART

In order to form a battery module having a desired output voltage by connecting a plurality of cells in series, it is known in the art to employ connectors. Generally, a cell for constituting a battery module includes a negative electrode in the form of metallic cell case which covers the cell entirely except for one end surface thereof. The opening on one end of the cell case is closed with a sealing assembly including a positive electrode plate made of metal. When connecting two cells in series, a connector is interposed between the positive electrode plate of one cell and the cell case constituting the negative electrode of the other cell, and electrically connected at predetermined locations to both of them. The connector is spot-welded to the cells, and therefore it connects the two cells not only electrically but also couples them mechanically together.

Spot welding usually includes applying electric current across a pair of welding electrodes which tightly hold a portion to be welded, so as to melt the portion held between the welding electrodes. In welding two cells together with a connector, however, the connector is interposed between the cells and cannot be held between the pair of welding electrodes, as a result of which electric current flows through the surfaces of the connector or the electrode plate across the welding electrodes, and in cases where the connector is thick or has a low specific resistance, the welding becomes difficult. That is, in accordance with the prior art method of connecting cells, since materials having a large thickness or a low specific resistance cannot be used for the connector, the electric resistance in the joint between two cells is large, and accordingly the loss at the joints where large current flows becomes large. Moreover, the mechanical strength of the connector is low, making the mechanical connection between adjacent cells low.

Figure 5:
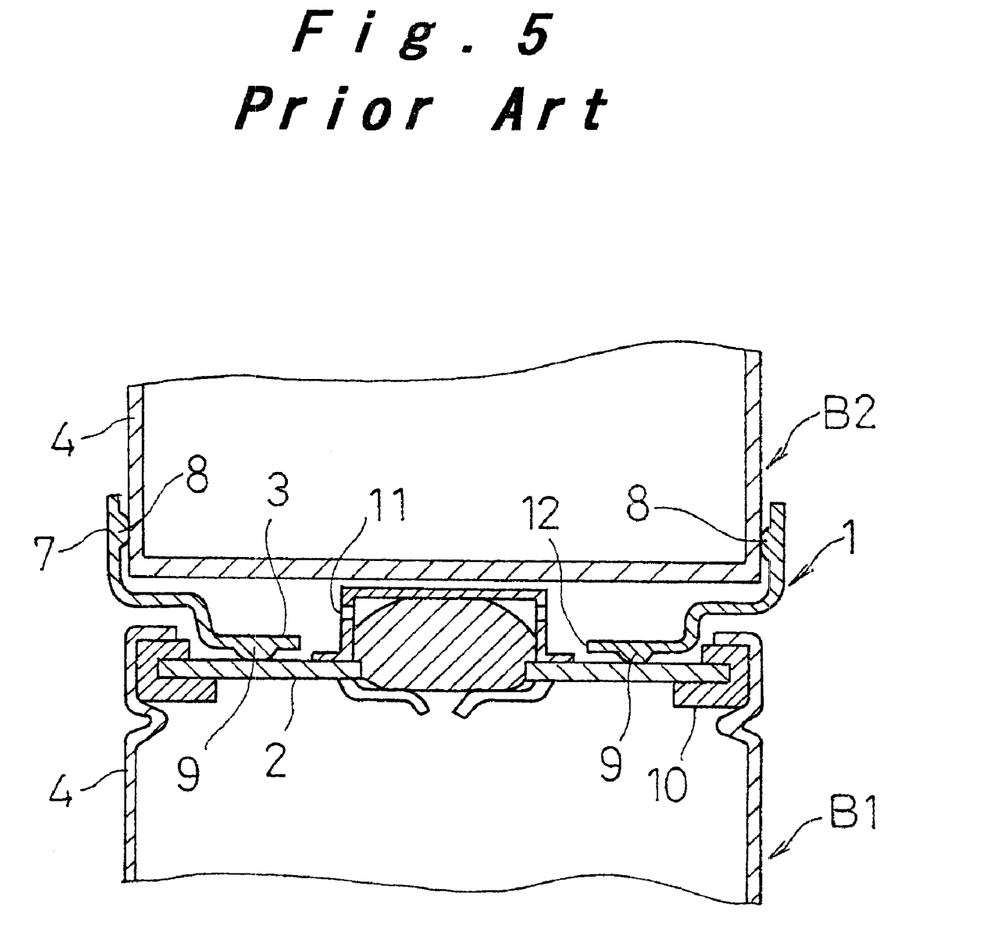
FIG. 5 is a longitudinal cross-sectional view showing a prior art cell connecting structure.

The inventors of the present application have previously proposed an improved structure for connecting cells and a welding method for reducing electrical connection resistance while enhancing mechanical connection strength, whereby the problems found in prior art are resolved. (Japanese Laid-open Patent Application No. 10-106533). FIG. 5 is a longitudinal cross sectional view showing this cell connecting structure. A connector 1 includes a flat bottom plate 3 abutted on a positive electrode plate 2 of one cell B1, and a cylindrical wall 7 oupled to a cell case 4 of the other cell B2 which doubles as the negative electrode thereof. A plurality of projections 8 and 9 for the welding purpose are formed each in circles on the cylindrical wall 7 and on the bottom plate 3. The drawing shows the cells before welding. The connector 1 is welded to the electrode plate 2 of one cell B1 through the projections 9 and joined thereto, while it is welded to the cell case 4 of the other cell B2 through the projections 8 and joined thereto.

Projection welding involves generation of heat by local concentration of electric current at the joints between two members to be welded together contacting each other in a very small area such as the projections 8, 9, where the electric resistance becomes largest. The contacting area melts by the heat and the two members are welded together. The portions to be welded need not be held tightly between the welding electrodes as in the spot welding. The connector 1 in the above-described connecting structure is welded respectively to the two cells B1, B2 by such projection welding, and therefore the choice of the material for the connector 1 need not depend on its thickness or specific resistance, and also, the welding strength can be improved. Moreover, since the electrode plate 2 and the cell case 4 are welded to the connector 1 at a plurality of locations on matching circles, the electric current flows the shortest distance through the joint between the cells. Thus the cells are coupled with high mechanical strength as well as with low electric resistance.

The cell connecting structure offers such advantages as described above, but still has problems to be resolved in practical application. That is, the projection welding in accordance with the above-described method includes at least two welding steps, one for welding the bottom plate 3 of the connector 1 to the electrode plate 2 of one cell B1, and one for welding the cylindrical wall 7 of the connector 1 to the cell case 4 of the other cell B2.

As the number of the cells to be connected increases, so does the number of the connector 1. The connector 1 has a considerably complex structure: It has a circular shape having a stepped bottom and a cylindrical wall projecting over the outside of the cell case 4 of cell B2 for detouring the gasket 10 of cell B1, and has an opening 12 in its center at the bottom for passing the cap-shaped positive electrode terminal 11 of cell B1 therethrough. Furthermore, although not shown, the cylindrical wall 7 of the connector 1 is formed with cut-outs for providing resiliency so that it makes tight engagement with the cell case 4 of cell B2 when coupled thereto, and the bottom plate 3 is also formed with cut-outs for preventing wasted current during the projection welding. Thus the connecting structure described above has high costs because of the large numbers of welding processes and components such as the connector 1, which has such a complex shape as described above and cannot be obtained at low cost.

Another problem is that, since the cylindrical wall 7 of the connector 1 is coupled over the cell case 4, the resultant battery module wherein a plurality of cells are connected has protruding portions at each joint of adjacent cells because of the increased outer diameter, leading to the problem of dimensional precision of an outer tube for covering the battery module. Furthermore, electric resistance at the joint between adjacent cells becomes large by the length of the electric current path passing through the connector 1.

In view of the problems in prior art as described above, it is an object of the present invention to provide a method and structure for connecting cells, whereby a reduction in cost is achieved, protruding portions are eliminated from the cell case of each cell, and the electric resistance at the joints between adjacent cells is reduced.

SUMMARY OF THE INVENTION

In order to achieve the above object, the present invention provides a cell connecting structure for coupling together two adjacent cells in a battery module wherein a plurality of cells are arranged coaxially in series and connected electrically. Each of the cells includes a cylindrical cell case having an open end and a bottom surface on the other end doubling as one electrode of the cells, and a sealing assembly for sealing the open end of the cylindrical cell case. The cell connecting structure of the invention includes a cell case of a first cell, and a sealing assembly, having a specific structure, of a second cell. The sealing assembly includes an electrode plate formed with a concavity in a central portion thereof, a valve body housed in the concavity, a valve body holding plate welded to an upper peripheral edge of the concavity for sealing the concavity, a connection electrode formed in an annular shape and protruded outwards in a direction along the axis of the cells at a location near outer peripheral edge of the electrode plate, and a plurality of projections formed on the connection electrode. The plurality of projections on the connecting electrode of the second cell are directly welded to the bottom surface of the cell case of a second cell.

According to the cell connecting structure of the invention, two adjacent cells among the plurality of cells arranged in series are connected in a single welding process step, wherein the connection electrode of one cell is directly welded to the cell case of the other cell without using a conventional connector. Accordingly, a considerable reduction in cost is achieved in view of the reduced number of welding process steps and the fewer number of parts such as connectors. Also, the two cells are coupled together at a location near the outer periphery of the cells, and therefore the bending strength between the cells is improved and they are stably connected with sufficient mechanical strength. A battery module formed by connecting a number of cells in accordance with such method can be housed precisely within a simple, cylindrical outer tube, because it has no protruding parts such as the conventional connector. Furthermore, the cell connecting structure enables electric current to pass through the shortest possible path between two cells, through the connection electrode that doubles as one electrode for one cell and the cell case that doubles as the other electrode for the other cell, and electric resistance is reduced accordingly.

The dimensional precision of the space for accommodating a valve body is improved as compared to the prior art sealing assembly structure, wherein such space was defined by the shape of a cap-shaped positive electrode terminal. The projections for the welding are formed on the connection electrode that protrudes upwards, and therefore the height of the projections can be freely set irrespective of the valve body accommodating space. Moreover, the connection electrode is formed in a ring-like shape along the periphery of the cell case, whereby the bending strength between the connected cells is enhanced.

In order to achieve the above object, the present invention provides a cell connecting method for coupling together two adjacent cells by welding, in a battery module wherein a plurality of cells are connected electrically in series. Each of the cells includes a cylindrical cell case having an open end and a bottom surface on the other end doubling as one electrode of the cells and a sealing assembly for sealing the open end of the cylindrical cell case. The cell connecting method includes the steps of:

forming a connection electrode in an annular shape protruded outwards in a direction of axis of the cells at a location near outer peripheral edge of the sealing assembly of the cells;

providing a plurality of projections on the connection electrode;

placing the plurality of projections of a first cell in contact with the bottom surface of the cell case of a second cell;

abutting a first welding electrode on a peripheral side face of the connection electrode of the first cell;

abutting a second welding electrode on a peripheral side face of the cell case of the second cell; and applying voltage across the first and second welding electrodes for welding the plurality of projections on the connection electrode of the first cell with the bottom surface of the cell case of the second cell.

Preferably, the first welding electrode abutted on the peripheral side face of the connection electrode of the first cell includes a planar insert having a width such as to allow itself to be inserted into a gap between a top end of the first cell and the bottom surface of the second cell, the planar insert being formed with an indentation conforming to the external contour of the connection electrode of the first cell.

Since there has not been devised a welding electrode having such planar insert as mentioned above, the prior art method involved at least two welding process steps as discussed with respect to the background art, in which the bottom plate 3 of a connector 1 was welded to the electrode plate 2 of one cell B1, after which two cells B1, B2 are arranged in series in close contact with each other, and then the welding electrode was abutted on the outer side of the cylindrical wall 7 of the connector 1 for welding the cylindrical wall 7 to the cell case 4 of the cell B2.

According to the present invention, because the welding electrode includes a planar insert having a width such as to allow itself to be inserted into a gap between the top of the first cell and the bottom of the second cell, the welding electrode can be inserted between two adjacent cells. In this way, the connection electrode of one cell is directly connected to the bottom of the cell case of the other cell in a single welding process step, and a considerable reduction in cost is achieved in view of the reduced number of welding process steps and the fewer number of parts such as connectors. Moreover, since the planar insert is formed with a semi-circular indentation at the distal end thereof which conforms to the outer shape of the connection electrode, electric current flows uniformly through the connection electrode via the planar insert, whereby the welding is performed favorably.

The planar insert is coated with a nonconductive layer on an upper face and a lower face thereof, whereby the welding electrode that is inserted into a small gap between two cells is prevented from contacting with either one of the cells located closely above or below the welding electrode and causing a short-circuit.

The plurality of projections for the welding purpose may be provided on the cell case of the cell instead of on the connection electrode on the sealing assembly of the cell, for achieving the same or similar benefits.

While novel features of the invention are set forth in the preceding, the invention, both as to organization and content, can be further understood and appreciated, along with other objects and features thereof, from the following detailed description and examples when taken in conjunction with the attached drawings.

DESCRIPTION OF PREFERRED EMBODIMENTS

Figure 1:
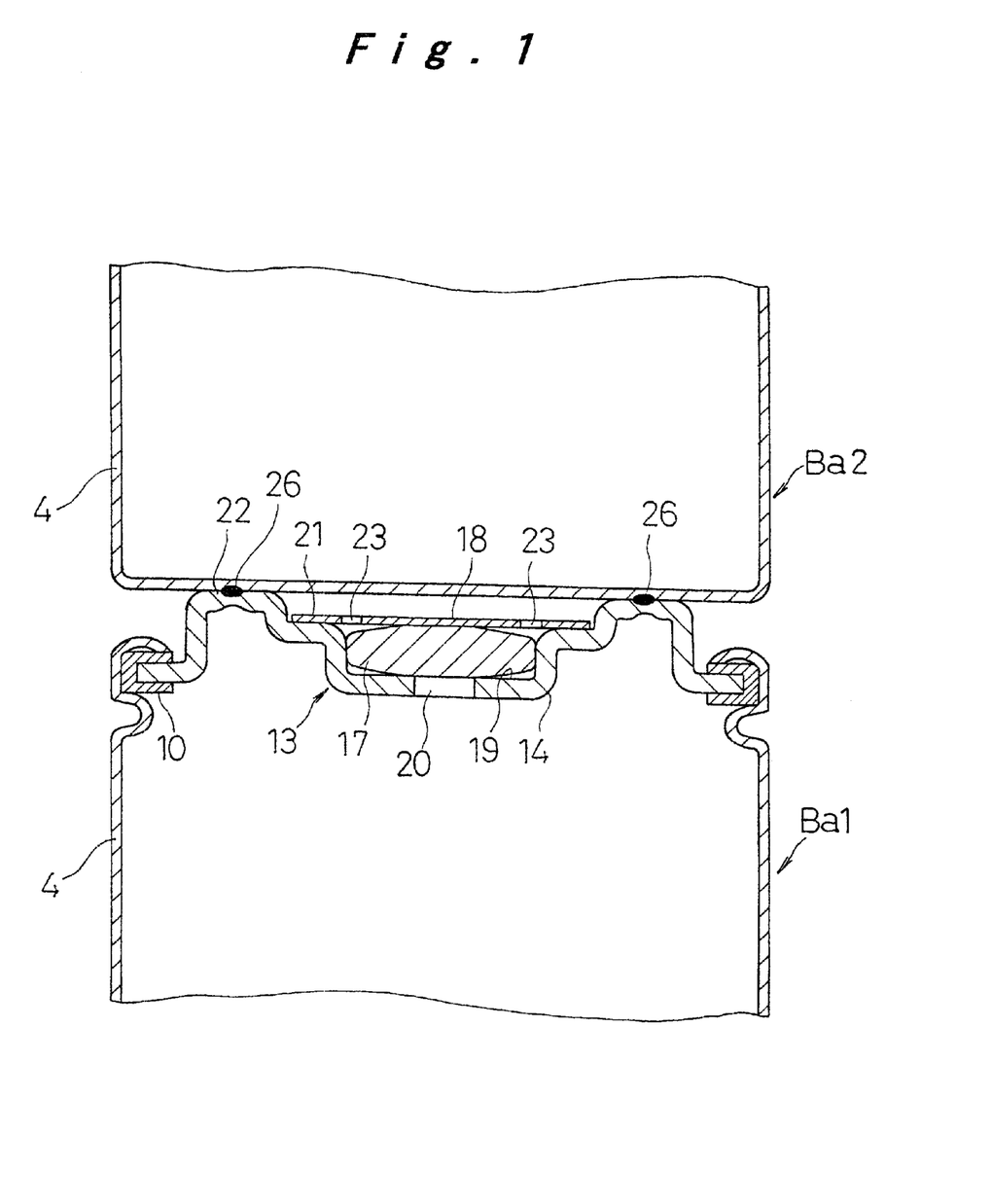
FIG. 1 is a longitudinal cross-sectional view showing the cell connecting structure in accordance with one embodiment of the present invention.

Preferred embodiments of the present invention will be hereinafter described with reference to the accompanying drawings. FIG. 1 is a longitudinal cross-sectional view showing the cell connecting structure in accordance with one embodiment of the present invention. The drawing illustrates only the major parts, and other constituent elements that are not directly related to the subject matter of the invention such as elements for electromotive force of the cells are not shown. Two cells Ba1 and Ba2 connected together are both of the same type and meet the same standards. The cell case 4 doubling as the negative electrode of the cells has a cylindrical shape with a bottom and covers the cylindrical cells Ba1, Ba2 except for one end face thereof. The open end of the cell case 4 is closed with a sealing assembly 13 including a gasket 10, an electrode plate 14 that doubles as the positive electrode of the cell, a rubber valve body 17, and a valve body holding plate 18.

Figure 2:
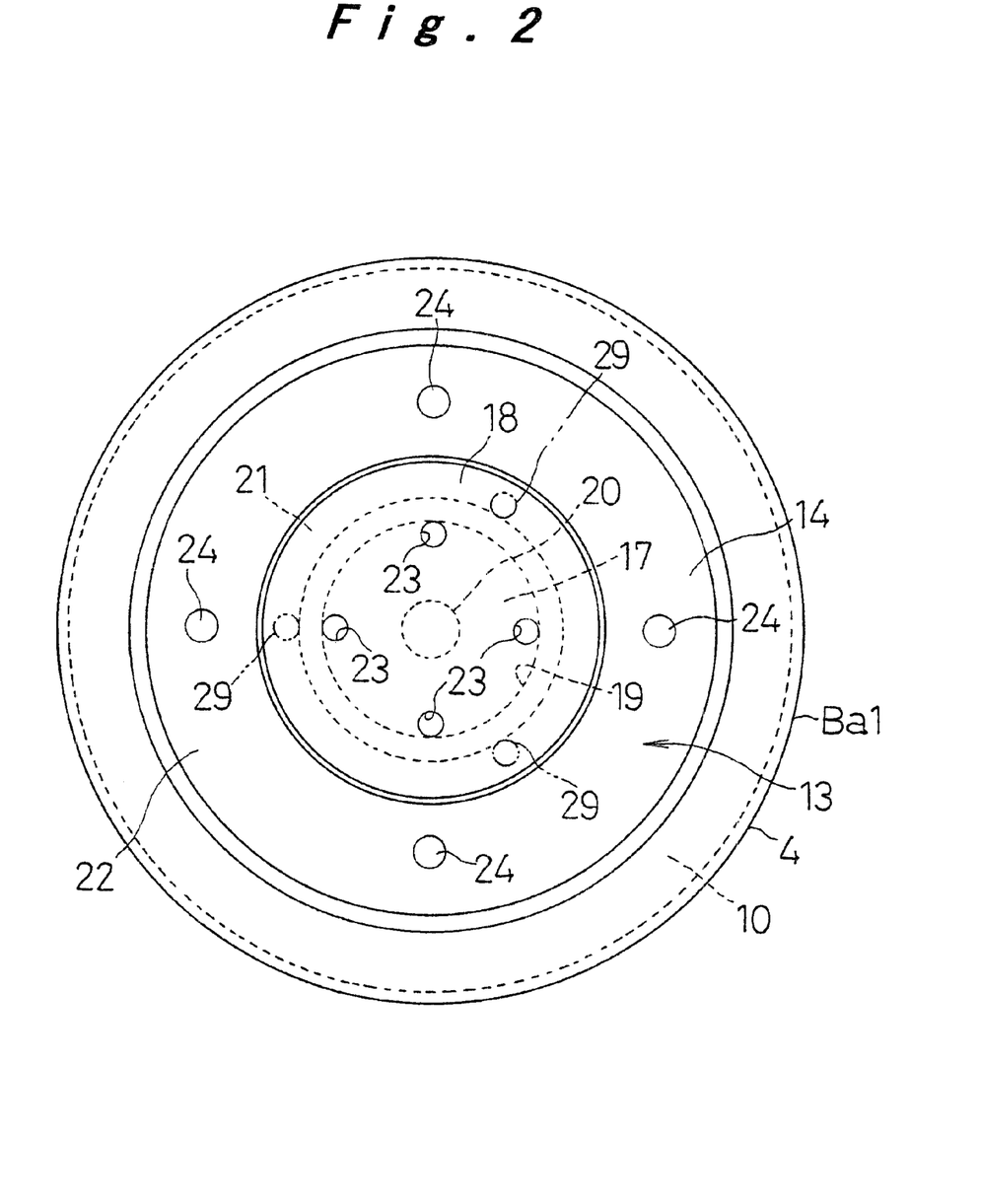
FIG. 2 is a plan view of a cell before being connected with the cell connecting structure of FIG. 1.

FIG. 2 is a plan view of the lower cell Ba1 seen from above before being connected with the upper cell Ba2 by projection welding. The positive electrode plate 14 is made of metal and formed in a circular shape, of which periphery is fixedly held with the crimped open end edge of the cell case 4 via the gasket 10 while being electrically insulated from the cell case 4 through the gasket 10. The electrode plate 14 is formed in its center with a circular concavity 19 for accommodating therein the rubber valve body 17, and a gas outlet 20 is opened in the middle of this concavity 19. The electrode plate 14 further includes an annular support surface 21 around the upper edge of the concavity 19 for holding thereon the circular valve body holding plate 18. The annular support surface 21 leads to a ring-like connection electrode 22 projected upwards on the outer side of the annular support surface 21.

The rubber valve body 17 is packed within the space defined by the concavity 19 and the valve body holding plate 18 welded to the annular support surface 21, so that the gas outlet 20 is blocked with the rubber valve body 17. When the internal pressure of the cell rises abnormally upon generation of gas and reaches a predetermined level, at which the rubber valve body 17 is elastically deformed and opens the gas outlet 20 under the gas pressure acting through the gas outlet 20, the gas generated within the cell is exhausted to the outside through the gas outlet 20 and gas ports 23 formed in the valve body holding plate 18.

Figure 3:
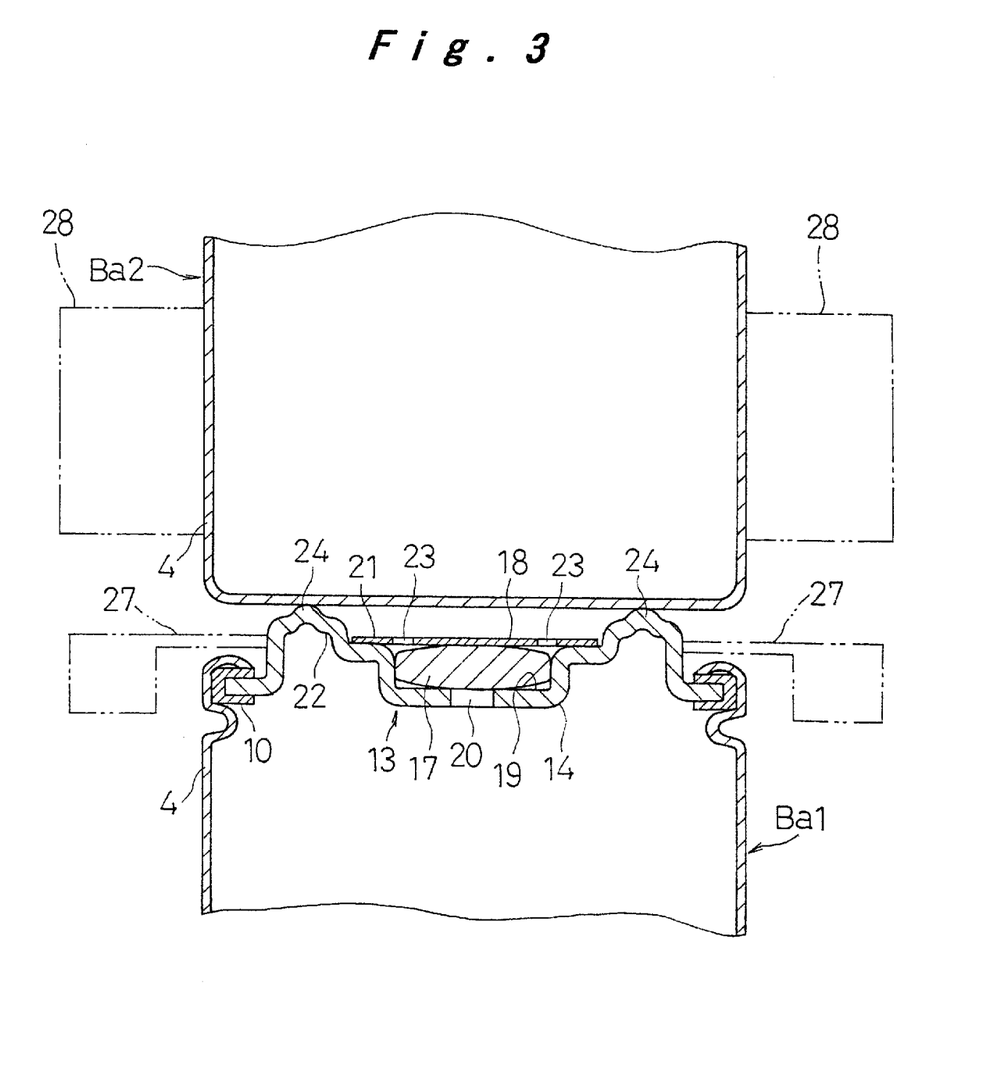
FIG. 3 is a longitudinal cross-sectional view showing the cell connecting structure before a welding process.

On the connection electrode 22 of the electrode plate 14, projections 24 are formed for the welding purpose by press-forming or the like at four equally spaced locations on a circle as shown in FIG. 2. FIG. 3 is a longitudinal cross-sectional view showing the cell connecting structure before the welding process. When two cells Ba1, Ba2 are arranged upon one another in series, the four projections 24 of one cell Ba1 abut on the bottom face of the cell case 4 of the other cell Ba2. In this state, welding electrodes 27 and 28 are respectively attached to the electrode plate 14 of one cell Ba1 and to the cell case 4 of the other cell Ba2 as illustrated in two-dotted chain lines in FIG. 3 for performing projection welding.

Figure 6:
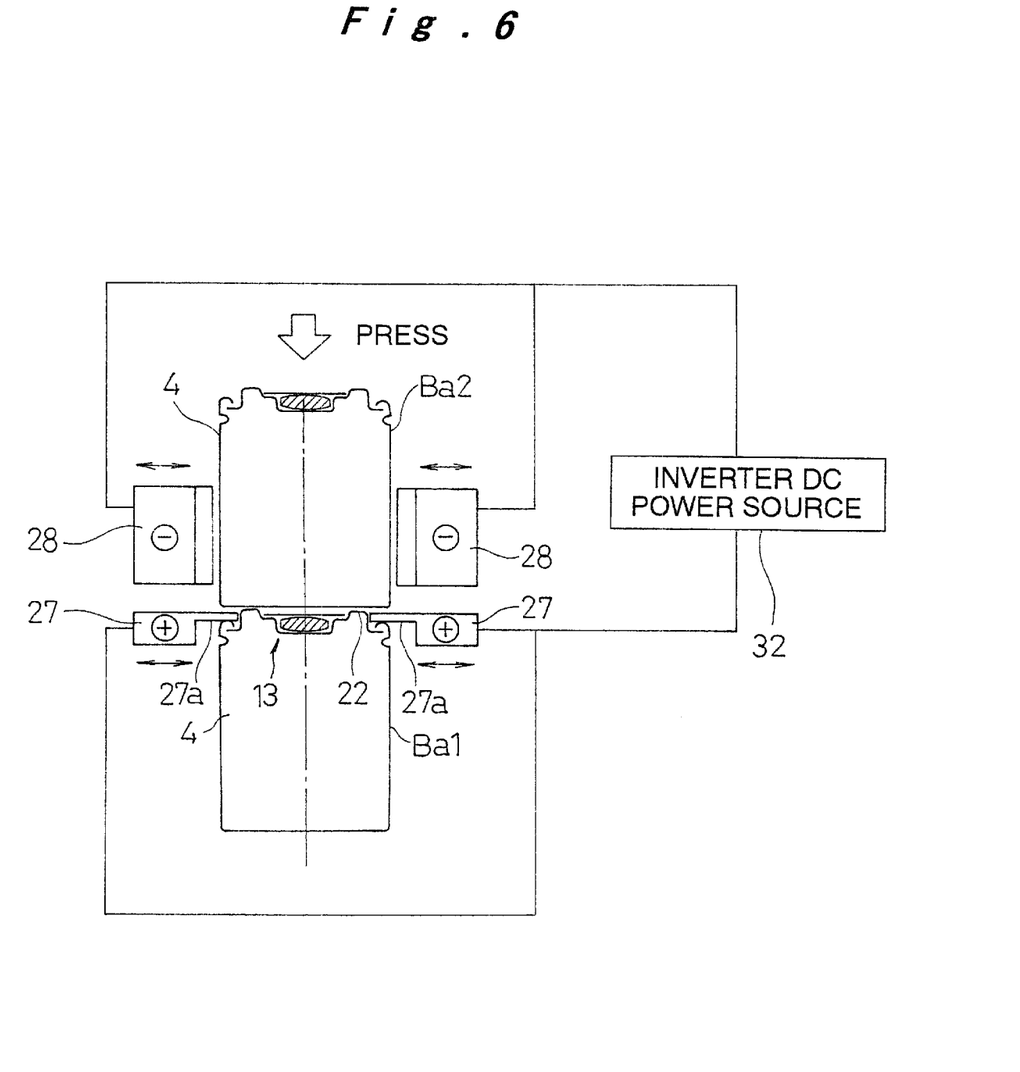
FIG. 6 is a conceptual diagram showing the method of connecting cells in accordance with the present invention.
Figure 7:
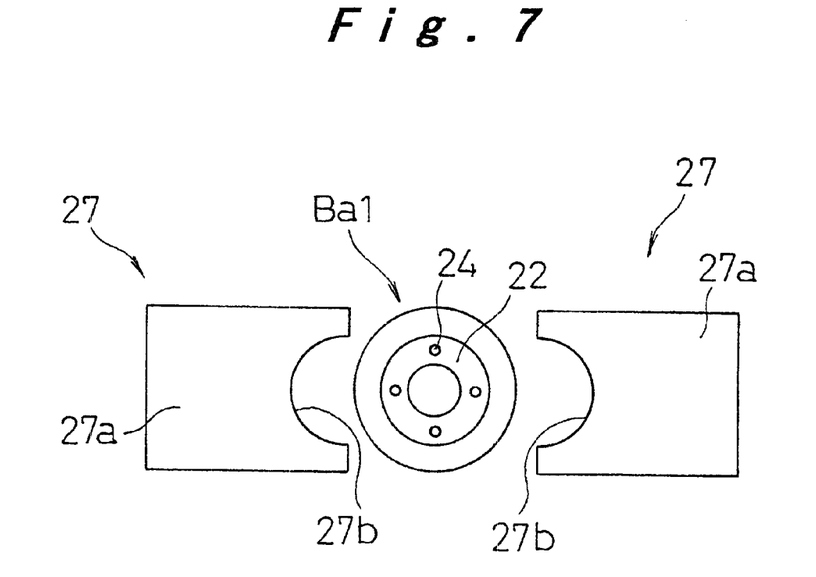
FIG. 7 is a schematic plan view of a welding electrode used in the method of connecting cells shown in FIG. 6.
Figure 8:
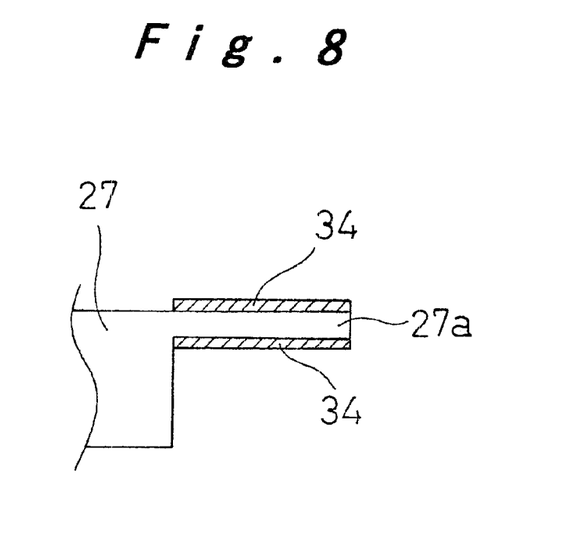
FIG. 8 is a cross sectional view showing major parts of the welding electrode of FIG. 7.

FIG. 6 is a schematic view showing the battery connecting method according to the present invention. FIG. 7 is a plan view and FIG. 8 is a cross sectional view, showing one welding electrode 27 placed in contact with the connecting electrode 22 of the cell Ba1.

As shown in FIG. 6, two cells are arranged in series and pressed in a direction of the arrow in the drawing, so that the projections of one cell Ba1 are kept in contact with the cell case bottom of the other cell Ba2. The positive side welding electrodes 27 are abutted on the peripheral surface of the connection electrode 22 of the sealing assembly 13 of one cell Ba1, while the negative side welding electrodes 28 are placed in contact with the circumferential face of the cell case 4 of the other cell Ba2, and voltage of about 10000 A is applied across both welding electrodes 27, 28 for 10 ms from an inverter DC power source 32 for performing projection welding to connect the two cells.

The welding electrode 27 abutted on the peripheral surface of the connection electrode 22 of one cell Ba1 has a planar insert 27a having a thickness which can be inserted into the gap formed between the top of the cell Ba1 and the bottom of the cell Ba2, for example of 0.7 mm and a width of about 50 mm. The planar insert 27a of the welding electrode 27 is formed with a semi-circular indentation 27b at the distal end thereof as shown in FIG. 7, which conforms to the external contour of the connection electrode 22. Thus the welding electrodes 27 are inserted into the gap between the serially-arranged cells and voltage is applied across both welding electrodes 27, 28, whereby the connection electrode of one cell is directly connected through the projections to the bottom face of the other cell by one welding process. The number of welding process steps and the number of components such as connectors are both reduced, and the overall cost is reduced accordingly. Since the planar insert 27a is formed with a semi-circular indentation 27b at the distal end thereof which conforms to the outer shape of the connection electrode 22, electric current flows uniformly through the connection electrode 22 via the planar insert 27a, whereby the welding is performed favorably.

The planar insert 27a of the welding electrode 27 is provided with a coating or a sheet of nonconductive material 34 such as fluorocarbon resin on both upper and lower faces thereof, so that there will be no short-circuiting between the welding electrode and the cell cases closely located above and below the welding electrode that is inserted into a small gap between the two cells. The nonconductive material sheet 34 may be provided on either one of the upper and lower faces of the planar insert 27a. However, it is more preferable to coat the welding electrode with such nonconductive material on both upper and lower faces thereof for preventing short-circuits. Various insulating resins may be used instead of fluorocarbon resin for the nonconductive material sheet 34. Fluorocarbon resin is favorable in terms of smoothness and its contaminant-free properties.

Figure 4:
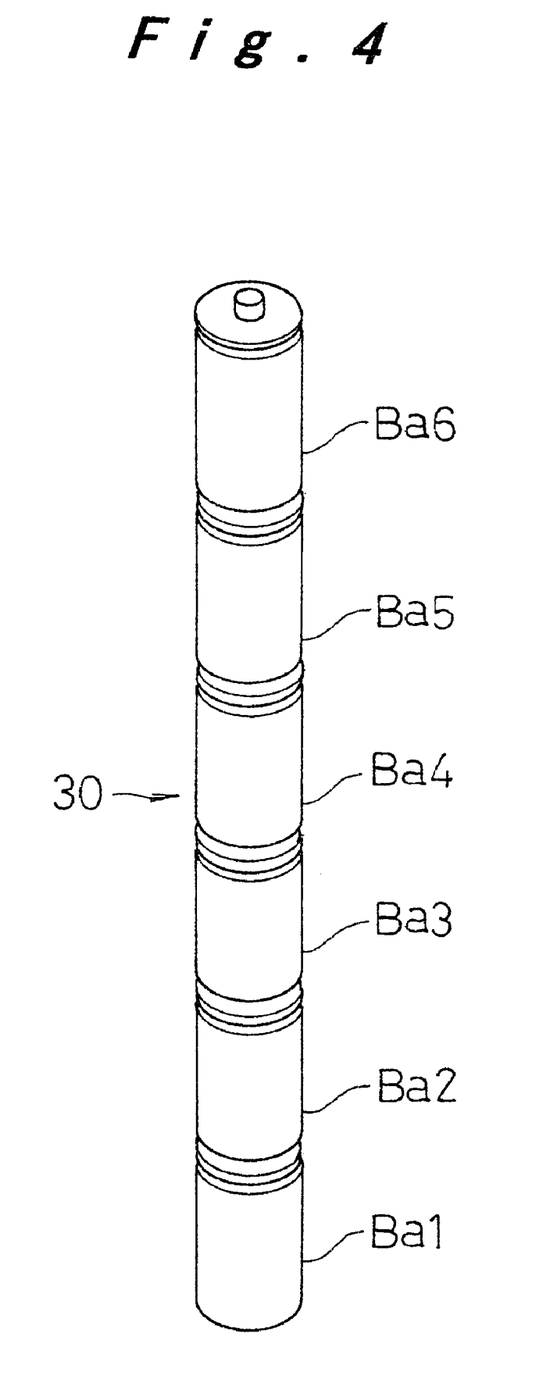
FIG. 4 is a perspective view of a battery module composed of a plurality of connected cells.

When voltage is applied for the welding, electric current is concentrated in a small contacting area between the projections 24 and the cell case where contact resistance is extremely small. Heat is generated by the local concentration of electric current, that melts the projections 24, whereby the two cells Ba1, Ba2 are joined together in series via molten nuggets 26, as shown in FIG. 1, with the connection electrode 22 in the electrode plate 14 of one cell Ba1 being in close contact with the cell case bottom of the other cell Ba2. Cells are thus connected in such a number as would output voltage of desired level. For example, six cells Ba1 to Ba6 are coupled together as shown in FIG. 4 to constitute a module 30 of a battery. In this case, a cell having a conventional structure can be used for the uppermost cell Ba6.

The valve body holding plate 18 is welded to the annular support surface 21 of the electrode plate 14 prior to the welding of two cells Ba1 and Ba2. For the welding of the valve body holding plate 18, a projection 29 is formed at three locations on a circle on the annular support surface 21 on the electrode plate 14, as illustrated in two-dotted chain lines in FIG. 2. The valve body holding plate 18 is abutted on these projections 29 and welded to the annular support surface 21 in close contact therewith. This welding process step corresponds to the step of welding the cap-shaped positive electrode terminal 11 to the electrode plate 2 in the prior art cell connecting structure illustrated in FIG. 5.

Therefore, while the prior art connecting method involves at least two welding process steps for connecting two cells B1, B2, the connecting method of the invention enables direct connection of the electrode plate 14 and the cell case 4 of two cells Ba1, Ba2 without a connector. As a result, a considerable reduction in cost is achieved in view of the reduced number of welding process steps and the reduced number of parts such as the connector 1 required in the prior art structure.

When connecting two cells Ba1, Ba2, instead of interposing a connector 1 as in the prior art between the cells, the ring-like connection electrode 22 of one cell Ba1, that is projected on the electrode plate 14 near the outer circumference of the cells, is welded to the bottom of the cell Ba2. That is, since the two cells are coupled together at a location near the outer circumference thereof, the bending strength between the two cells is high and the cells remain stably in mutual connection. Thus the mechanical strength required for the connection of plurality of cells is ensured. Moreover, as is clear from FIG. 4, the battery module 30 formed by connecting a number of cells Ba1 to Ba6 has no projecting parts such as the connector 1 in the prior art structure. Therefore the module 30 can be housed precisely within a simple, cylindrical outer tube without presenting problems associated with dimensional precision of the outer tube. Furthermore, the electric current flows through the shortest possible path between the two cells Ba1, Ba2 through the electrode 14 and the cell case 4, and the electric resistance is reduced accordingly.

In the sealing assembly 13 of the above-described embodiment, the space for accommodating the rubber valve body 17 is defined by the shape of the concavity 19 formed in the electrode plate 14. The dimensional precision of the valve body accommodating space is improved as compared to the prior art sealing assembly structure, wherein such space was defined by the shape of the cap-shaped positive electrode terminal 11. The projections 24 for the welding are formed on the connection electrode 22 that protrudes upwards farther than the annular support surface 21, on which the valve body holding plate 18 is placed and welded to close the concavity 19, and therefore the height of the projections 24 can be freely set irrespective of the valve body accommodating space.

Figure 9:
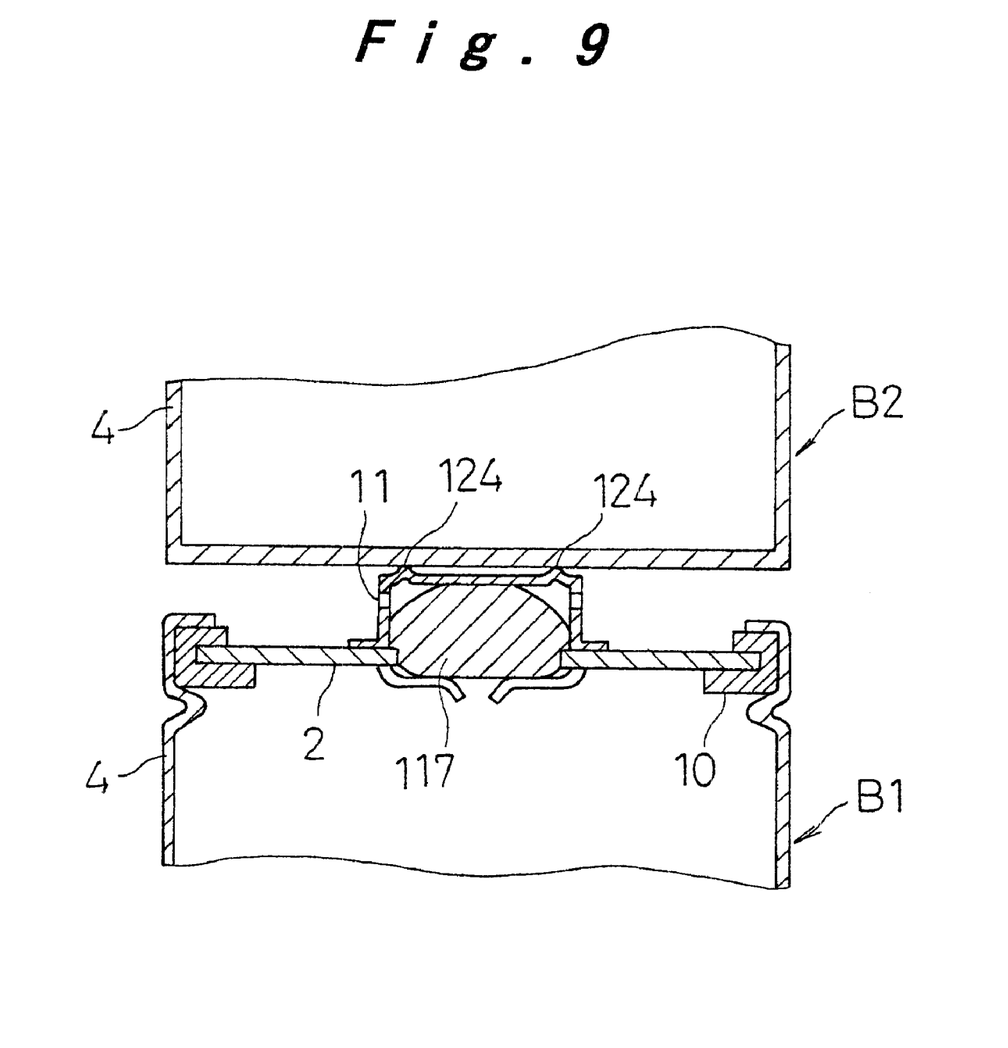
FIG. 9 is a longitudinal cross-sectional view showing one example of possible modification to the existing cell connecting structure.

It would be possible to eliminate the connector 1 in the prior art structure and to provide a plurality of projections for welding on the cap-shaped positive electrode terminal 11 protruded upwards on the electrode plate 2 as illustrated in FIG. 9, so that the positive electrode terminal 11 is welded directly to the bottom surface of the battery case 4 of the upper cell B2. Comparing this structure with that of the above-described embodiment, the bending strength between the cells B1 and B2 is insufficient and the necessary mechanical strength cannot be ensured, because the positive electrode terminal 11 is located substantially in the center of the electrode plate 2. Also, the welding electrode must be inserted into near the center between the two cells within the narrow space between the electrode plate 2 of one cell B1 and the bottom face 3 of the cell case 4 of the other cell, which may induce a risk that the welding electrode comes in contact with either cell B1 or B2 and causes a short-circuit. Furthermore, in the cell connecting structure shown in FIG. 9, the current path passes through two welded spots: the welds between the projections 124 and the bottom surface of the upper cell B2, and the welds between the cap-shaped positive electrode terminal 11 and the electrode plate 2. The electric current path becomes longer as compared to the structure shown in FIG. 1 wherein the two cells are connected through the nugget 26, which increases electric resistance accordingly, and the loss at the connection between a plurality of cells becomes higher.

In contrast, according to the cell connecting method of the above-describe embodiment, the welding electrode 27 need be only slightly inserted into a gap between the connection electrode 22 of one cell Ba1 and the bottom surface of the cell case 4 of the other cell Ba2, so as to contact the connection electrode 22 protruded on the cell on the outer periphery thereof, whereby the welding efficiency is remarkably improved. Moreover, as compared to the structure shown in FIG. 9 wherein the welding points are set upon the cap-shaped positive electrode terminal 11 which covers the rubber valve body 117, the cell connecting structure illustrated in FIG. 1 has the projections 24 for the welding on top of the connection electrode 22 that is near the outer periphery of the cell, i.e., the welding which involves generation of heat is performed at a point away from the rubber valve body 17, and therefore heat degradation of the rubber valve body 17 is prevented. Accordingly, the cell connecting structure shown in FIG. 1 is more preferable.

Figure 10:
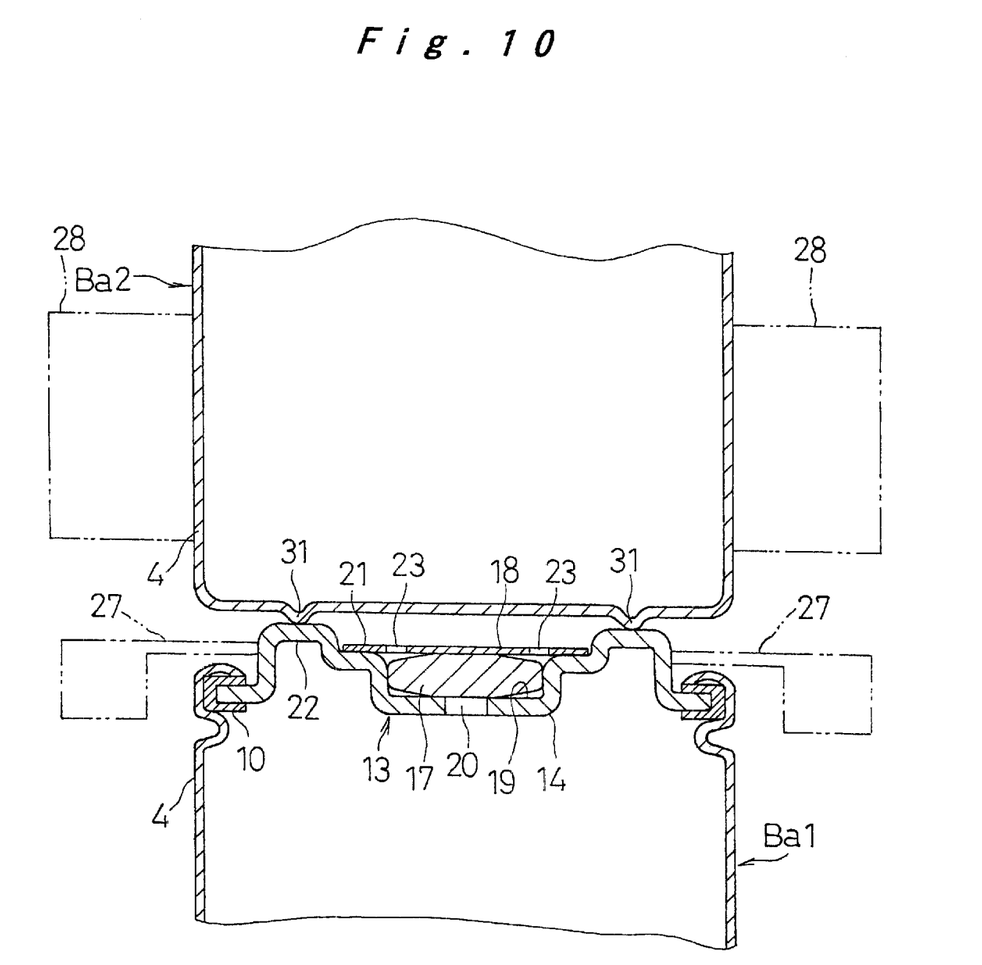
FIG. 10 is a longitudinal cross-sectional view of the cell connecting structure in accordance with another embodiment of the present invention.

The cell connecting structure according to the present invention is not limited to the examples discussed above and other various designs are possible. For example, as shown in FIG. 10, instead of providing projections 31 for the welding on the connection electrode 22 of the sealing assembly 13, they may be formed by press-forming or the like at a plurality of locations on the bottom surface of the cell case 4. Similarly to the embodiment described in the foregoing, two cells are arranged in series and, in a state where the projections 31 provided on the bottom surface of the cell case 4 of one cell Ba2 are in contact with the connection electrode 22 of the other cell Ba1, welding is performed by applying a voltage across positive and negative welding electrodes, with the positive side welding electrode 27 attached to the side periphery of the connection electrode 22 of the sealing assembly 13 of the cell Ba1 and with the negative side welding electrode 28 attached to the side periphery of the cell case 4 of the cell Ba2, for connecting the cells electrically and mechanically.

According to the cell connecting structure and method of the present invention, as described above, the connection electrode of one cell and the cell case of another cell are connected directly without interposing a conventional connector by a single welding process. A considerable reduction in cost is achieved in view of the reduction in the number of welding process steps and in the number of parts such as the connector. A battery module formed by connecting a number of cells in accordance with such method can be housed precisely within a simple, cylindrical outer tube, because it has no protruding parts such as the conventional connector. Furthermore, the cell connecting structure enables electric current to pass through the shortest possible pass between two cells, through the connection electrode that doubles as one electrode for one cell and the cell case that doubles as the other electrode for the other cell, and electric resistance is reduced accordingly. Thus the cell connecting structure and method according to the present invention offer various advantages for connecting a plurality of cells to constitute a battery module having a desired output voltage.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. In a battery module wherein a plurality of cells are arranged coaxially in series and connected electrically, a cell connecting structure for coupling together two adjacent cells, each of said cells including a cylindrical cell case having an open end and a bottom surface on the other end doubling as one electrode of said cells and a sealing assembly for sealing the open end of the cylindrical cell case, comprising:

a cell case of a first cell; and a sealing assembly of a second cell, said sealing assembly including an electrode plate formed with a concavity in a central portion thereof, a valve body housed in said concavity, a valve body holding plate welded to an upper peripheral edge of the concavity for sealing the concavity, a connection electrode formed in an annular shape and protruded outwards in a direction of axis of the cells at a location near an outer peripheral edge of said electrode plate, and a plurality of projections formed on said connection electrode, wherein said plurality of projections on the connecting electrode of the second cell are directly welded to the bottom surface of said cell case of the first cell.

2. In a battery module wherein a plurality of cells are arranged in series and connected electrically, a cell connecting method for coupling together two adjacent cells by welding, each of said cells including a cylindrical cell case having an open end and a bottom surface on the other end doubling as one electrode of said cells and a sealing assembly for sealing the open end of the cylindrical cell case, comprising the steps of:

forming a connection electrode in an annular shape protruded outwards in a direction of axis of said cells at a location near an outer peripheral edge of said sealing assembly of the cells;

providing a plurality of projections on said connection electrode; placing said plurality of projections on the connection electrode of a first cell in contact with the bottom surface of the cell case of a second cell;

abutting a first welding electrode on a peripheral side face of the connection electrode of said first cell;

abutting a second welding electrode on a peripheral side face of the cell case of said second cell; and applying voltage across said first and second welding electrodes for welding said plurality of projections on the connection electrode of the first cell with the bottom surface of the cell case of the second cell.

3. The cell connecting method according to claim 2, wherein the first welding electrode abutted on the peripheral side face of the connection electrode of the first cell includes a planar insert having a width such as to allow itself to be inserted into a gap between a top end of the first cell and the bottom surface of the second cell, said planar insert being formed with an indentation conforming to the external contour of the connection electrode of the first cell.

4. The cell connecting method according to claim 3, wherein the planar insert is coated with a nonconductive layer on an upper face and a lower face thereof.

5. In a battery module wherein a plurality of cells are arranged coaxially in series and connected electrically, a cell connecting structure for coupling together two adjacent cells, each of said cells including a cylindrical cell case having an open end and a bottom surface on the other end doubling as one electrode of said cells and a sealing assembly for sealing the open end of the cylindrical cell case, comprising:

a plurality of projections formed on the bottom surface of a cell case of a first cell; and a sealing assembly of a second cell, said sealing assembly including an electrode plate formed with a concavity in a central portion thereof, a valve body housed in said concavity, a valve body holding plate welded to an upper peripheral edge of the concavity for sealing the concavity, a connection electrode formed in an annular shape and protruded outwards in a direction of axis of the cells at a location near outer peripheral edge of said electrode plate, wherein said plurality of projections on the bottom surface of the cell case of the first cell are directly welded to the connection electrode on the sealing assembly of the second cell.

6. In a battery module wherein a plurality of cells are arranged coaxially in series and connected electrically, a cell connecting method for coupling together two adjacent cells by welding, each of said cells including a cylindrical cell case having an open end and a bottom surface on the other end doubling as one electrode of said cells and a sealing assembly for sealing the open end of the cylindrical cell case, comprising the steps of:

forming a connection electrode in an annular shape protruded outwards in a direction of axis of said cells at a location near a peripheral edge of said sealing assembly of the cells;

providing a plurality of projections on the bottom surface of the cell case of the cells;

placing said plurality of projections on the bottom surface of the cell case of a first cell in contact with the connection electrode on the sealing assembly of a second cell;

abutting a first welding electrode on a peripheral side face of the connection electrode of said second cell;

abutting a second welding electrode on a peripheral side face of the cell case of said first cell; and applying voltage across said first and second welding electrodes for welding said plurality of projections on the bottom surface of the cell case of the first cell with the connection electrode on the sealing assembly of the second cell.

7. A battery comprising:

a cylindrical case having an open end and a bottom surface on the other end doubling as one electrode of said battery;

an electrode plate for sealing the open end of the cylindrical case;

a connection electrode formed on said electrode plate in an annular shape and protruded outwards in a direction of axis of the battery; and a plurality of projections formed on said connection electrode.

8. The battery according to claim 7, wherein said electrode plate is formed with a concavity in a central portion thereof, with a valve body being housed in said concavity, and a valve body holding plate being welded to an upper peripheral edge of the concavity for sealing the concavity.

9. A battery module, wherein a plurality of batteries are arranged in series, each of said batteries comprising:

a cylindrical case having an open end and a bottom surface on the other end doubling as one electrode of said battery;

an electrode plate for sealing the open end of the cylindrical case;

a connection electrode formed on said electrode plate in an annular shape and protruded outwards in a direction of axis of the battery; and a plurality of projections formed on said connection electrode, wherein said connection electrode on the electrode plate of one battery is welded to the bottom surface of the cylindrical case of an adjacent battery.

10. A method of manufacturing a battery module, wherein a plurality of batteries are arranged in series, each of said batteries including a cylindrical case having an open end and a bottom surface on the other end doubling as one electrode of said battery, an electrode plate for sealing the open end of the cylindrical case, comprising the steps of:

forming a connection electrode on the electrode plate of the battery such as to protrude outwards in a direction of axis of the battery;

providing a plurality of projections on said connection electrode;

placing said plurality of projections of one battery in contact with the bottom surface of the cylindrical case of an adjacent battery;

abutting a first welding electrode on a peripheral side face of the connection electrode of said one battery;

abutting a second welding electrode on a peripheral side face of the cylindrical case of said adjacent battery; and applying voltage across said first and second welding electrodes for welding said plurality of projections of said one battery with the bottom surface of the cylindrical case of said adjacent battery.

11. A method of manufacturing a battery module, wherein a plurality of batteries are arranged in series, each of said batteries including a cylindrical case having an open end and a bottom surface on the other end doubling as one electrode of said battery, an electrode plate for sealing the open end of the cylindrical case, comprising the steps of:

forming a connection electrode on the electrode plate of the battery such as to protrude outwards in a direction of axis of the battery;

providing a plurality of projections on said connection electrode;

placing said plurality of projections of one battery in contact with the bottom surface of the cylindrical case of an adjacent battery;

abutting a first welding electrode on a peripheral side face of the connection electrode of said one battery;

abutting a second welding electrode on a peripheral side face of the cylindrical case of said adjacent battery; and applying voltage across said first and second welding electrodes for welding said plurality of projections of said one battery with the bottom surface of the cylindrical case of said adjacent battery, wherein the first welding electrode abutted on the peripheral side face of the connection electrode of said one battery includes a planar insert having a width such as to allow itself to be inserted into a gap between a top end of said one battery and the bottom surface of the adjacent battery, said planar insert being formed with an indentation conforming to the external contour of the connection electrode of the battery.

12. The method of manufacturing a battery module according to claim 11, wherein the planar insert is coated with a nonconductive layer on an upper face and a lower face thereof.

13. A battery module, wherein a plurality of batteries are arranged in series, each of said batteries comprising:

a cylindrical case having an open end and a bottom surface on the other end doubling as one electrode of said battery;

an electrode plate for sealing the open end of the cylindrical case;

a connection electrode formed on said electrode plate in an annular shape and protruded outwards in a direction of axis of the battery; and a plurality of projections formed on the bottom surface of the cylindrical case, wherein said connection electrode of one battery is welded to the plurality of projections on the bottom surface of the cylindrical case of an adjacent battery.

14. A method of manufacturing a battery module, wherein a plurality of batteries are arranged in series, each of said batteries including a cylindrical case having an open end and a bottom surface on the other end doubling as one electrode of said battery, an electrode plate for sealing the open end of the cylindrical case, comprising the steps of:

forming a connection electrode on the electrode plate of the battery such as to protrude outwards in a direction of axis of the battery;

providing a plurality of projections on said connection electrode;

placing said plurality of projections of one battery in contact with the bottom surface of the cylindrical case of an adjacent battery;

abutting a tip of a first welding electrode on a peripheral side face of the connection electrode of said one battery;

abutting a second welding electrode on a peripheral side face of the cylindrical case of said adjacent battery; and applying voltage across said first and second welding electrodes for welding said plurality of projections of said one battery with the bottom surface of the cylindrical case of said adjacent battery.

* * * * *